United States Patent [19]

Furuichi et al.

[11] Patent Number: 4,506,308
[45] Date of Patent: Mar. 19, 1985

[54] MAGNETIC HEAD ASSEMBLY

[75] Inventors: Shinji Furuichi, Kumagaya; Shigetoshi Morita, Saitama; Shunichi Taka; Hirohisa Suwabe, both of Kumagaya, all of Japan

[73] Assignee: Hitachi Metals, Ltd., Tokyo, Japan

[21] Appl. No.: 421,448

[22] Filed: Sep. 22, 1982

[30] Foreign Application Priority Data

Oct. 7, 1981 [JP] Japan ............... 56-159595

[51] Int. Cl.³ ............ G11B 5/12; G11B 5/27; G11B 5/42; H01F 7/06
[52] U.S. Cl. .................. 360/121; 29/603; 360/118
[58] Field of Search ............ 360/121, 120, 119, 127, 360/122, 118, 125, 66, 123; 29/603

[56] References Cited

U.S. PATENT DOCUMENTS

| | | | |
|---|---|---|---|
| 3,842,494 | 10/1974 | Chiba | 360/120 |
| 4,048,714 | 9/1977 | Huntt | 29/603 |
| 4,085,429 | 4/1978 | Hasegawa | 360/119 |
| 4,110,804 | 8/1978 | Castrodale | 360/121 |
| 4,172,318 | 10/1979 | Huntt | 29/603 |
| 4,276,574 | 6/1981 | Baasch | 360/121 |
| 4,316,228 | 2/1982 | Fujiwara | 360/127 |
| 4,423,550 | 1/1984 | Fujioka | 360/121 |

Primary Examiner—Robert M. Kilgore
Attorney, Agent, or Firm—Antonelli, Terry & Wands

[57] ABSTRACT

A magnetic head assembly comprising a read/write head unit adapted for reading and writing data and provided with a magnetic core 1 having a thin sheet of an Mn-Zn ferrite. The magnetic head assembly also has erase head units bonded to the read/write head unit and adapted to erase the edges of the data, each of the erase head units being provided with a magnetic core 2 having a thin sheet of an Ni-Zn ferrite. The read/write head unit and erase head units are bonded by means of a glass 6.

4 Claims, 4 Drawing Figures

MAGNETIC HEAD ASSEMBLY

BACKGROUND OF THE INVENTION

The present invention relates to a magnetic head device having, in combination, a read/write head unit having a read/write magnetic core and an erase head unit having an erase magnetic core.

A magnetic device has been put into practical use which device has a rotary magnetic medium and a magnetic head assembly adapted to be moved on the rotating medium in the radial direction of the latter thereby to successively write or read signals in or out of the medium. In this type of device, the magnetic head assembly is driven by a stepping motor, linear motor, hydraulic servomotor or the like. In such driving means, it is not always possible to obtain a constant pitch of movement of the magnetic head assembly so that the position of the magnetic head assembly is often deviated from the aimed position corresponding to the destined track. This inconveniently causes such a problem that the magnetic read/write device cannot stably read the signals in the medium when the signals has been recorded in the medium by another magnetic device, due to the offset of the track.

In order to obviate this problem, a proposal is made in U.S. patent application Ser. No. 387564 filed on Aug. 10, 1973, wherein a read/write head unit having a read/write head gap and an arase head unit having an earse head gap are combined with each other in such a manner that there is accurately erased the edge of a track adjacent to another track in which an information is newly written.

In the magnetic head assembly of the kind described, the track density can be increased by reducing the thicknesses of respective cores. A mere thinning of the cores, however, causes such a problem particularly when the material of the core has a low saturation flux density that the magnetic flux emerges not only from the gap in the core but also from the portions around the gap due to low level of magnetic saturation of the core, although it is desirable that the magnetic flux emerges only from the gap portion of the core.

Various approaches have been made for increasing the coercive force of the medium in order to attain a higher writing density in the magnetic medium. One of such approaches is to use an Mn-Zn ferrite having a high saturation magnetic flux density as the material of the ferrite head. The Mn-Zn ferrite, however, suffers various problems such as inferior mechanical strength and difficulty in the control of atmosphere in high-temperature treatment such as bonding, as compared with Ni-Zn ferrite.

Namely, when the temperature of the Mn-Zn ferrite is raised in the atmosphere containing excessive oxygen, the oxygen is inconveniently included into the ferrite to make the ferrite too rich in oxygen thereby to deteriorate the magnetic characteristics of the ferrite. The deterioration of the magnetic characteristics takes place also when the atmosphere does not contain sufficient oxygen. It is also to be noted that the Mn-Zn ferrite has a greater tendency of reaction with the bonding glass than the Ni-Zn ferrite does.

It may be possible to eliminate the above-described shortcomings by using the Ni-Zn ferrite as the material of only the erase head core in the magnetic head assembly. Such a countermeasure, however, imposes a new problem concerning the coefficient of thermal expansion. Namely, the Mn-Zn ferrite and Ni-Zn ferrite exhibit mean thermal expansion coefficients at temperature ranges between 0° and 300° ranging between, respectively, $110 \times 10^{-7}$ and $130 \times 10^{-7}$ $\Delta l/l/\text{deg}$. and $80 \times 10^{-7}$ and $90 \times 10^{-7}$ $\Delta l/l/\text{deg}$. The difference between these coefficient values exceeds $10 \times 10^{-7}$ $\Delta l/l/\text{deg}$ which is considered as being the upper limit of the difference in this field of art for glass bonding, so that there is caused a fear of occurrence of cracking in a case where the Mn-Zn ferrite and the Ni-Zn ferrite are bonded by means of a glass, and this is the reason why the bonding of these two kinds of ferrites has been made by a resin but not by a glass. The resin used for bonding, however, is much more unstable against change in temperature and humidity than glass. Consequently, the resin bonding often causes a change in distance between layers bonded each other and in bonding strength, resulting in a deterioration in the precision of the magnetic head.

SUMMARY OF THE INVENTION

Accordingly, it is an object of the invention to provide a magnetic head assembly having a combination of a read/write head unit and an erase head unit, suited for writing at high density and stable against change in temperature and humidity, thereby to overcome the above-described problems of the prior art.

It is another object of the invention to provide a magnetic head assembly composed of a read/write head unit having a core made of an Mn-Zn ferrite and an erase head unit having a core made of an Ni-Zn ferrite, the read/write head unit and the erase head unit being bonded to each other by means of a glass.

To these ends, according to the invention, there is provided a magnetic head asembly comprising: a read/write head unit for reading or writing data and having a magnetic core made from a thin sheet of an Mn-Zn ferrite; and erase head units bonded to the read/write head unit and adapted to erase the edge portions of the data, the erase head units having magnetic cores of Ni-Zn ferrite made from thin sheets of an Ni-Zn ferrite; the bonding between the read/write head unit and the erase head units being made by means of a glass.

The above and other objects, features and advantages of the invention will become clear from the following description of the preferred embodiment taken in conjunction with the accompanying drawings.

DESCRIPTION OF THE PREFERRED EMBODIMENT

Figure 1:
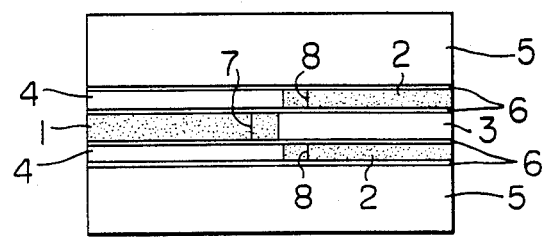
FIG. 1 is a schematic front elevational view of a magnetic head assembly in accordance with an embodiment of the invention.
Figure 2:
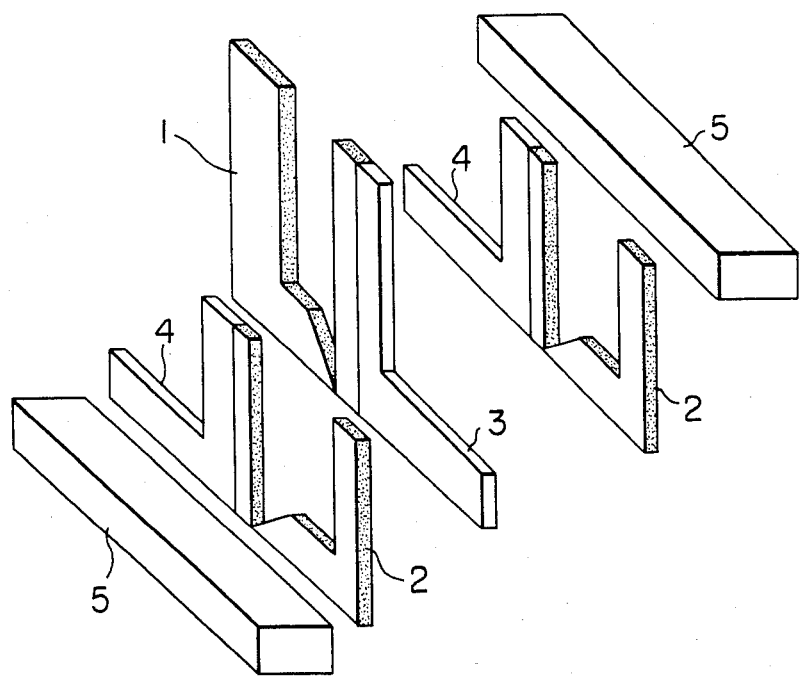
FIG. 2 is an exploded view of parts in the embodiment shown in FIG. 1.

Referring first to FIG. 1 which is a schematic front elevational view of a magnetic head in accordance with an embodiment of the invention, a reference numeral 1 denotes a substantially U-shaped core of a read/write head unit, comprising a thin sheet of an Mn-Zn ferrite having a thickness of between 0.13 and 0.35 mm. The Mn-Zn ferrite consists essentially of 20 to 40 mol % of MnO, 12 to 30 mol % of ZnO and 48 to 55 mol % of $Fe_2O_3$. A reference numeral 2 denotes substantially U-shaped cores of an erase head, comprising a thin sheet of an N-Zn ferrite of a thickness ranging between 0.07 and 0.16 mm. The Ni-Zn ferrite consists essentially of 18 and 23 mol % of NiO, 28 to 34 mol % of ZnO and 49 to 53 mol % of $Fe_2O_3$. An auxiliary plate 3 of a non-magnetic material having a substantially L-shaped form has the same thickness as the core 1, and is bonded to the inner side of magnetic pole portion of the core 1 within the same plane as the core 1 by means of lead boron-silicate glass having a softening point not less than 550° C. Auxiliary plates 4 made of a non-magnetic material and having a substantially L-shaped form have the same thickness as the core 2 and are bonded to the inner side of magnetic pole portions of the cores 2 within the same planes as the cores 2 by the above-mentioned lead boron-silicate glass. Auxiliary plates 5 made of a non-magnetic material have a rectangular cross-section having a breadth of about 4.5 mm and a height of about 1.5 mm. These auxiliary plates 5 are bonded to the cores 2 at opposite sides to the core 1. As will be seen from FIG. 1, the cores 1, 2 and auxiliary plates 3, 4, 5 are stacked in layers in a manner like sandwich and are bonded such that the bases of these members are in a common plane. In the arrangement shown in FIG. 1, the auxiliary plate 4 and the erase head unit core 2 are disposed at each side of the combination of the rear/write head unit core 1 and the auxiliary plate 3, and the auxiliary plate 5 is disposed at the outer side of each combination of the core 2 and the auxiliary plate 4. The auxiliary plates 3, 4 and 5 are made of a non-magnetic material consisting of titanium oxide and calcium oxide or of titanium oxide and barium oxide, and the bonding of the cores 1, 2 and auxiliary plates 3, 4, 5 is made by lead boron-silicate glass 6.

The core 1 is provided in the base surface thereof with a read/write conversion gap 7, while the core 2 is provided in the base surface thereof with a erase conversion gap 8.

Each core has a coil and a power supply which are known per se through the disclosure of, for example, the specification of the U.S. patent application Ser. No. 387564. The coils and power supplies are omitted from the drawings because these parts do not constitute any essential parts of the invention.

The bonding glass 6 is applied to one or both surfaces of each of the auxiliary plates 4, 5 and the erase head core 2 to a thickness of 0.3 to 10 or so by a known method such as spattering, screen printing or the like method.

Figure 3:
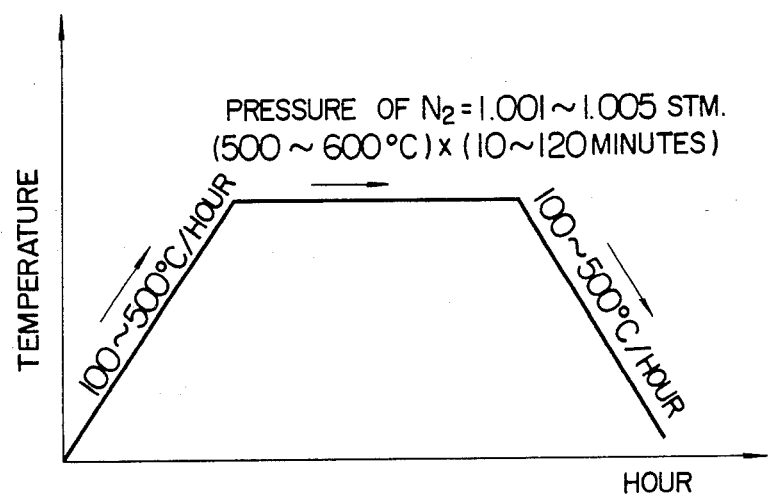
FIG. 3 is an illustration of the treating condition of heat bonding by means of glass.

The erase head core 2 and the auxiliary plates 4, 5 applied with the bonding glass and the read/write head having no bonding glass thereon were brought together in the manner shown in FIG. 1 and were heated up to a temperature of about 500° to 600° C. which is about 50° to 150° C. higher than the softening point of the bonding glass, for effecting a heat bonding. The heat bonding was conducted within a furnace of a nitrogen atmosphere having an oxygen partial pressure of not more than 0.1%, in order to suppress the oxidation of the Mn-Zn ferrite, under the condition shown in FIG. 3 and by means of an instrument shown in FIG. 4.

Figure 4:
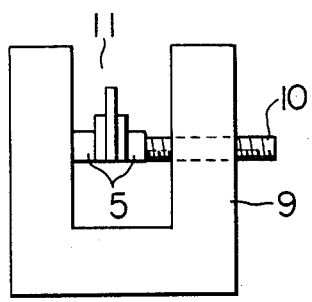
FIG. 4 is an illustration of an instrument used in the heat bonding.

Namely, in FIG. 4, a reference numeral 9 denotes a U-shaped pedestal made of a ceramic material and provided with a groove 11. The pedestal 9 has a tightening screw 10 made of a ceramic material. In the illustrated embodiment, cores 1, 2 and auxiliary plates 3, 4, 5 are interposed between the pedestal 9 and the screw 10, and the screw 10 was tightened with a torque of 0.4 to 0.8 Kg. Then, the treatment under the condition shown in FIG. 3 was conducted within a heat-treating furnace.

Various magnetic head assemblies were fabricated using materials of cores 1, 2 and materials of auxiliary plates 3, 4, 5 having various thermal expansion coefficients, in combination with bonding glasses having different softening points. These magnetic head assemblies were subjected to a test for examinations of tendency of cracking and of reduction in the bonding strength. The testing condition was as follows.

1. Holding at high temperature: 150° C. × 1,000 hours
2. Holding at constant temperature and high humidity:
   40° C. × 90% humidity × 1,000 hours
3. Heat cycle: −40° C. to 150° C. and vice versa × 100 cycles
4. Anti-chemical resistance:
   immersion in water and organic solvent × 200 hours The result of the test is shown in Table 1 below. The reduction in bonding strength was examined by a destructive test.

TABLE 1

|  | Thermal expansion coefficient of Mn—Zn ferrite (read/write hand 1) | Thermal expansion coefficient of Ni—Zn ferrite (erase head) | Thermal expansion coefficient of non-magnetic material (auxiliary plate 3) | Thermal expansion coefficient of non-magnetic material (auxiliary plate 4) | Thermal expansion coefficient of non-magnetic material (auxiliary plate 5) | Softening point of bonding blass °C. | Result |
| --- | --- | --- | --- | --- | --- | --- | --- |
| Example 1 | $110 \times 10^{-7}$ | $85 \times 10^{-7}$ | $89 \times 10^{-7}$ | $80 \times 10^{-7}$ | $80 \times 10^{-7}$ | 420 | OK |
| Example 2 | $103 \times 10^{-7}$ | $89 \times 10^{-7}$ | $82 \times 10^{-7}$ | $90 \times 10^{-7}$ | $90 \times 10^{-7}$ | 350 | OK |
| Example 3 | $120 \times 10^{-7}$ | $94 \times 10^{-7}$ | $97 \times 10^{-7}$ | $100 \times 10^{-7}$ | $100 \times 10^{-7}$ | 450 | OK |
| Example 4 | $130 \times 10^{-7}$ | $85 \times 10^{-7}$ | $93 \times 10^{-7}$ | $100 \times 10^{-7}$ | $80 \times 10^{-7}$ | 400 | Crack in read/write head |
| Example 5 | $120 \times 10^{-7}$ | $85 \times 10^{-7}$ | $120 \times 10^{-7}$ | $80 \times 10^{-7}$ | $90 \times 10^{-7}$ | 340 | Crack in read/write head and reduction of bonding strength between read/write head and |

TABLE 1-continued

| Thermal expansion coefficient of Mn—Zn ferrite (read/write hand 1) | Thermal expansion coefficient of Ni—Zn ferrite (erase head) | Thermal expansion coefficient of non-magnetic material (auxiliary plate 3) | Thermal expansion coefficient of non-magnetic material (auxiliary plate 4) | Thermal expansion coefficient of non-magnetic material (auxiliary plate 5) | Softening point of bonding blass °C. | Result |
|---|---|---|---|---|---|---|
| | | | | | | erase head |

These thermal expansion coefficients are of mean values within temperature range between 0° C. and 300° C. and are shown in terms of Δl/l/deg. in unit.

The unit of the softening point is °C.

As will be understood from the results in the Table, according to the invention, the occurence of cracking or tearing of the head is avoided with the following combination of the thermal expansion coefficients (mean value within temperature range of between 0° C. and 300° C.) of materials and softening point of bonding glass: thermal expansion coefficient α of Mn-Zn ferrite as the material of read/write head 1 falling within the range of $$110^{+15}_{-10} \times 10^{-7},$$

thermal expansion coefficient α of the auxiliary plate 3 falling within the range of $$89^{+15}_{-10} \times 10^{-7},$$

thermal expansion coefficient α of Ni-Zn ferrite as the material of the erase head 2 falling within the range of α $89\pm5\times10^{-7}$, thermal expansion coefficient α of the auxiliary plate 4 attached to the head 2 falling within the range of $90\pm10\times10^{-7}$ and thermal expansion coefficient α of auxiliary plate 5 falling within the range of $90\pm10\times10^{-7}$, and the softening point S.P. of the glass represented by S.P.≧350° C.

Particularly, the magnetic head assemblies of Examples 1 to 3 shown in the Table exhibited a high precision as the magnetic head even when subjected to a large temperature variation of between −40° C. and 150° C. and a high humidity of 90%, as well as a high bonding strength which is equivalent to or higher than the bending resistance of ferrite.

Because of the construction explained above, the magnetic head assembly of the invention exhibits superior read/write electromagnetic conversion characteristics when used in combination with a medium having a high coercive force or a medium having a high track density. In addition, the magnetic head assembly of the invention can maintain the precision of magnetic head quite stably against any change in temperature and humidity.

Although the invention has been described through specific terms, it is to be noted here that the described embodiment is not exclusive and various changes and modifications are possible without departing from the scope of the invention which is limited solely by the appended claims.

What is claimed is:

1. A magnetic head assembly comprising: a read/write head unit for reading or writing data and having a magnetic core provided with a thin sheet of an Mn-Zn ferrite; and erase heads bonded to said read/write head unit and adapted to erase the edge portions of said data, said erase head units having magnetic cores of Ni-Zn ferrite provided with thin sheets of an Ni-Zn ferrite; the bonding between said read/write head unit and said erase head units being made by means of a glass.

2. A magnetic head assembly according to claim 1, wherein, within the temperature range of between 0° C. and 300° C., the Mn-Zn ferrite core exhibits a mean thermal expansion coefficient ranging between $100\times10^{-7}$ and $125\times10^{-7}$, the Ni-Zn ferrite core exhibits a mean thermal expansion coefficient ranging between $84\times10^{-7}$ and $94\times10^{-7}$, an auxiliary plate jointed to the inner magnetic pole of said read/write head exhibits a mean thermal expansion coefficient of $81\times10^{-7}$ and $104\times10^{-7}$, each of auxiliary plates jointed to the inner magnetic poles of said erase head units exhibits a mean thermal expansion coefficient ranging between $80\times10^{-7}$ and $100\times10^{-7}$, and each of auxiliary plates disposed at the sides of said erase head units opposite to said read/write head unit having a mean thermal expansion coefficient ranging between $80\times10^{-7}$ and $100\times10^{-7}$.

3. A magnetic head assembly according to any one of claims 1 and 2, wherein the bonding glass has a softening point not lower than 350° C.

4. A magnetic head assembly according to any one of claims 1 and 2, wherein said Mn-Zn ferrite core consists essentially of 20 to 40 mol % of MnO, 12 to 30 mol % of ZnO and 48 to 55 mol % of $Fe_2O_3$ while said Ni-Zn ferrite core consists essentially of 18 to 23 mol % of NiO, 28 to 34 mol % of ZnO and 49 to 53 mol % of $Fe_2O_3$.

* * * * *